United States Patent [19]

Nojiri et al.

[11] 4,147,295
[45] Apr. 3, 1979

[54] METHOD AND APPARATUS FOR RECOGNIZING BAR CODES

[75] Inventors: Tadao Nojiri, Kariya; Akio Sugiura, Nagoya, both of Japan

[73] Assignee: Nippondenso Co., Ltd., Kariya, Japan

[21] Appl. No.: 813,426

[22] Filed: Jul. 6, 1977

[30] Foreign Application Priority Data

Aug. 18, 1976 [JP] Japan .................... 51-98414

[51] Int. Cl.² .......................... G06K 7/14; G06K 9/13
[52] U.S. Cl. .................................. 235/463; 235/470; 340/146.3 Z
[58] Field of Search ............... 235/463, 470, 462, 466, 235/383, 487; 250/566, 568, 569; 340/146.3 Z, 149 A; 360/2

[56] References Cited

U.S. PATENT DOCUMENTS

| 3,596,060 | 7/1971 | Tibbals | 235/470 |
| 3,676,645 | 7/1972 | Fickenscher | 235/463 |
| 3,761,685 | 9/1973 | Alpert | 235/463 |
| 3,778,597 | 12/1973 | Vanderpool | 235/463 |
| 3,811,033 | 5/1974 | Herrin | 340/146.3 Z |
| 3,838,251 | 9/1974 | Herrin | 340/146.3 Z |
| 3,849,632 | 11/1974 | Eckert | 235/463 |
| 3,857,020 | 12/1974 | Higginbotham | 235/470 |
| 3,891,831 | 6/1975 | Coles | 235/463 |

Primary Examiner—Robert M. Kilgore
Attorney, Agent, or Firm—Cushman, Darby & Cushman

[57] ABSTRACT

A bar code recognition system in which a threshold value for discriminating each bar of bar codes is automatically corrected. Bar codes representing information are constituted by a combination of wide and narrow bars to be scanned and converted into a rectangular signal having a time width proportional to the width of each bar. In proportion to the total time widths of the rectangular signal generated in each scanning cycle, the threshold value with reference to which each bar width is discriminated is determined to enhance the recognition operation of the system.

12 Claims, 4 Drawing Figures

METHOD AND APPARATUS FOR RECOGNIZING BAR CODES

BACKGROUND OF THE INVENTION

The present invention relates to a system for recognizing bar codes having wide and narrow bars, and more particularly to a system in which a threshold value for discriminating each bar width is corrected automatically.

A bar code recognition system in which an information is coded into a bar code and each information is recognized by scanning each bar code is known well. It is also a well known matter in this prior art system that the bar code is scanned and converted into a rectangular signal having a time width proportional to each bar width, and the bar width is discriminated by comparing each time width of the rectangular signal with a threshold value, thus decoding the bar code. The threshold value is predetermined to be constant in general, therefore the validity of decoded information becomes low when, for instance, some of bar codes are recorded smaller than the other.

SUMMARY OF THE INVENTION

It is, therefore, a primary object of the invention to provide a bar code recognition system in which a threshold value for discriminating the bar width is automatically corrected.

It is another object of the invention to correct the threshold value in accordance with total bar widths of bars scanned in one scanning cycle.

It is a further object of this invention to correct the threshold value in proportion to total widths of bars detected in the preceding scanning cycle.

DESCRIPTION OF THE PREFERRED EMBODIMENT

Figure 1:
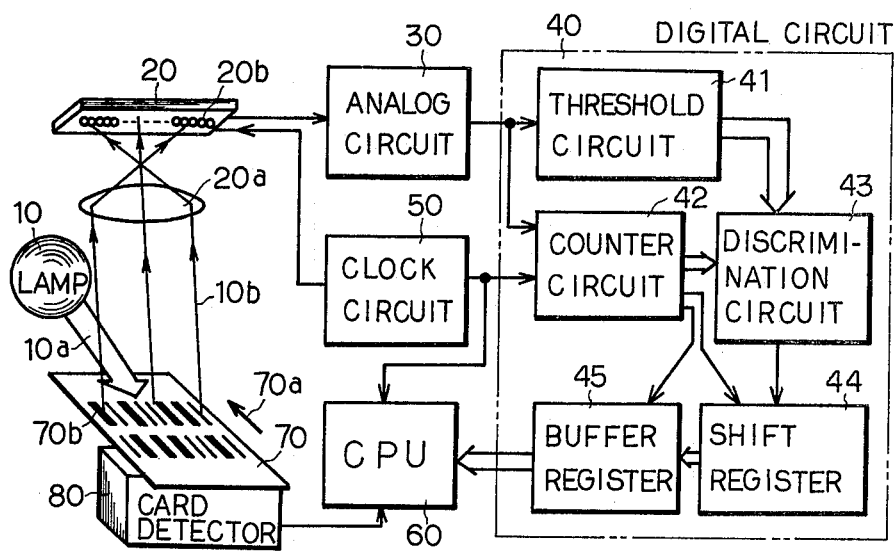
FIG. 1 is a schematic view illustrating a bar code recognition system according to the present invention.

The overall construction of the system is described at first with reference to FIG. 1.

In FIG. 1, a light source 10 such as a reflector lamp is employed to uniformly supply illumination light 10a over a card 70 by which bar codes 70b are carried. A lens 20a for converging the reflection light 10b reflected by the card 70 and an image sensor 20 having a plurality of light responsive elements aligned to constitute a straight scanning line 20b for receiving the converged light are optically coupled over the card 70. The bar codes 70b has a plurality of bars arranged parallelly on the card 70. The card 70 is moved in a direction 70a which is parallel with the longitudinal direction of the bars and orthogonal to the scanning line 20b of the image sensor 20. The image sensor 20 is connected to a clock circuit 50 so that each element of the image sensor 20 is driven one by one in response to each clock pulse of a fixed frequency generated by the clock circuit 50 and generates an image signal having the signal level corresponding to the light density of the reflected light 10b. The elements of the image sensor 20 are further adapted to be driven in a cyclic manner so that each bar code on the card 70 is scanned repeatedly. It should be noted that the image signal generated by the image sensor 20 is not affected by variations in the moving speed of the card 70, because the bar code scanning direction is orthogonal to the card moving direction 70a. The image sensor 20 is connected to an analog circuit 30 in which the image signal successively applied from the image sensor 20 is converted into a rectangular signal having the signal level and the time width corresponding to the density and the width of the reflected light 10b, respectively. It must be understood herein that the level and the width of the rectangular signal respectively represent the light reflectivity and the width of bars of the bar codes 70b, since the light density of the reflected light 10b is dependent on the light reflectivity of the bars. A digital circuit 40 is connected to receive the rectangular signal from the analog circuit 30 and clock pulses from the clock circuit 50, for converting the serial rectangular signal into a parallel digital signal which is available for signal processing operation in a central processing unit 60. The central processing unit 60 is constructed as a digital computer in which bar code decoding process is programmed. A card detector 80 is positioned beneath a card moving passage (not shown) to detect the existence of the card 70. The card detector 80 generates a detection signal indicative of the existence of the card 70, when the illumination light 10a is cut off by the card 70. This detection signal is applied to the central processing unit 60 which is adapted to start decoding process.

In the digital circuit 40, numeral 41 denotes a threshold circuit for determining the threshold value in response to the time width of the rectangular signal applied during each scanning cycle of the image sensor 20, 42 denotes a counter circuit for measuring the width of each bar by counting the clock pulses during each time width of the rectangular signal, and 43 denotes a discrimination circuit for discriminating each bar width by comparing the output value of the counter circuit 42 with the threshold value determined by the threshold circuit 41. The discrimination result with respect to each bar is represented by a binary number "1" or "0" which is an output of the discrimination circuit 43. Further in the digital circuit 40, numeral 44 denotes a shift register for sequentially storing the binary output of the discrimination circuit 43, and numeral 45 denotes a buffer register for temporarily storing the binary output of the shift register 44 at every time when the shift register 44 completes storing as many numbers of discrimination outputs as bars in each bar code.

The bar codes 70b schematically illustrated in FIG. 1 are described next with reference to FIGS. 2 and 3.

Figure 2:
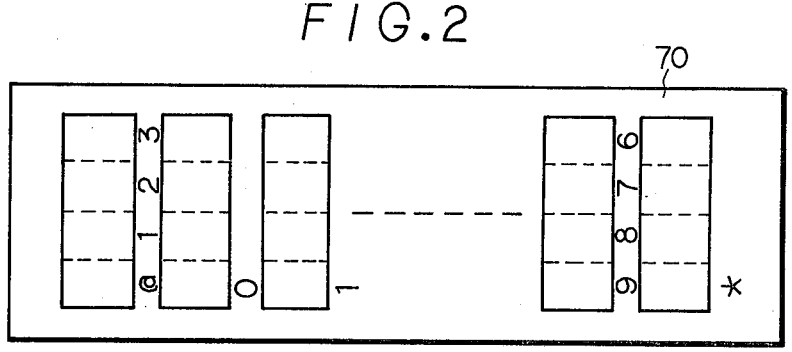
FIG. 2 is an enlarged plan view illustrating the information card shown in FIG. 1.

As shown in FIG. 2, twelve group bar codes (@, 0, 1, 2, . . . . , 8, 9, *) are juxtaposed from the head (left side in the Figure) to the tail (right side in the Figure) of the card 70. The group bar code is spaced from the adjacent group bar code by a predetermined width. Each group bar code lying in the central portion of the card 70 includes four bar codes which are divided by a dotted line in the Figure.

Figure 3:
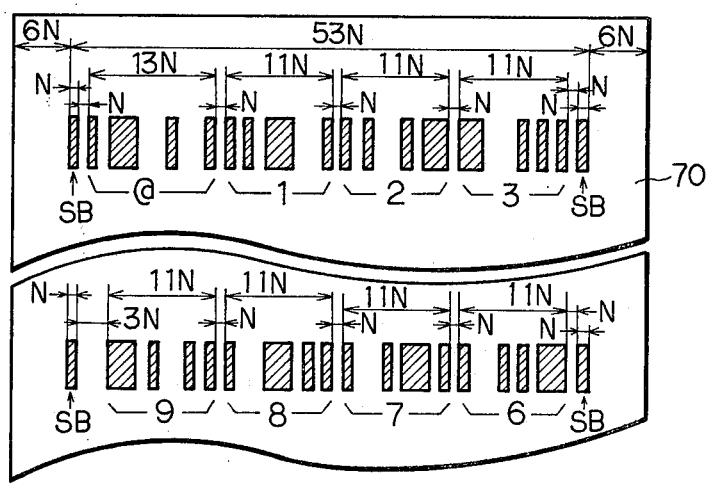
FIG. 3 is an enlarged view illustrating two group bar codes recorded on the card shown in FIG. 2.

Two exemplary group bar codes (@ and 9) are shown in FIG. 3 in which two space bars SB are illustrated at the head and the tail of each group. Each bar code has seven bars among which four bars are recorded in black and three bars are recorded in white. Each white bar in one bar code is arranged between the black bars so that each bar code starts with the black bar and ends with the black bar. Further among seven bars, constituting one bar code which is a numerical bar code, five bars are determined to be narrow (N) and two bars are determined to be wide (W) in such a manner that the wide bar is three times wider than the narrow bar. One wide bar and the other wide bar between two wide bars are recorded in black and in white, respectively. The space bar SB is determined to be a narrow bar in black and a narrow bar in white is interposed between the adjacent bar codes. A narrow bar in white is interposed between the space bar SB and an index bar code such as @ and *, whereas a wide bar in white is interposed between the space bar SB and the numerical bar code such as 1, 2, . . . 9. Each group bar code including two space bars SB, as a result, has the constant length 53 N. It should be noted herein that the first and the twelfth group bar codes have respective index bar codes @ and * which includes three wide bars. These index bar codes @ and * are advantageous in that whether the scanning direction is forward or reverse is discriminated. Record prohibition spaces having the width 6 N are provided beside each group bar code.

The operation mode of the system shown in FIG. 1 is described on condition that the card 70 carrying the bar codes shown in FIG. 3 is moved to be scanned.

When the card 70 is moved over the card detector 80, the card detection signal is generated by the detector 80 and the central processing unit 60 is rendered operative by the detection signal. During the movement of the card 70, the first group bar code having the index bar code @ is supplied with the illumination light 10a thereon and the reflection light 10b having the light density which is dependent on the color of the bar is received at the sensing line 20b of the image sensor 20. The image sensor 20 having light responsive elements which are driven one by one by the clock pulse generates the image signal corresponding to the reflection light 10b. Four light responsive elements are alotted for scanning the reflection light 10b reflected by the narrow bar and twelve light responsive elements are allotted for scanning the reflection light 10b reflected by the wide bar. Therefore, 4 pulses and 12 pulses of the clock circuit 50 are necessitated for scanning the narrow bar and wide bar, respectively. The image signal is then applied serially to the analog circuit 30 and converted into the rectangular signal. This rectangular signal becomes high level and low level while the black bar and the white bar are scanned, respectively. This rectangular signal has a time width which is substantially proportional to the bar width. The rectangular signal is then applied serially to the digital circuit 40 to be converted into the parallel digital signal. In this digital circuit 40, the time width of the rectangular signal is discriminated whether it corresponds to the wide bar or the narrow bar so that each digit of the parallel digital signal represents each bar width and that the wide bar and the narrow bar are represented by the respective low level "0" and high level "1". Therefore, the index bar code @ shown in FIG. 3 is converted into the parallel digital signal "1100101". Other numerical bar codes among the first group bar code are also converted into the parallel digital signal in the same manner as the index bar code @. After scanning the first group bar code repeatedly, the other group bar codes are scanned sequentially from the second group to the last group in the same manner as the first group.

It should be noted in the abovedescribed operation that the time width of the rectangular signal is discriminated with reference to the threshold value which is corrected in accordance with the total time width of the rectangular signal generated in one scanning cycle. Provided that each bar is recorded precisely on the card 70, the threshold value is desirably determined to be the medium value (2 N) between the narrow bar width (N) and the wide bar width (W=3 N). The threshold value must be increased and decreased proportionally as the bar width increases and decreases, respectively. The threshold values $H_w$ and $H_B$ for respective white bar and black bar are corrected in accordance with the total width $L_w$ of the white bars and the total width $L_B$ of the black bars in each group bar code, respectively. Since the total width $L_w$ including five spaces in white becomes 27 N and the total width $L_B$ including two space bars in black becomes 26 N when all the bar codes are recorded desirably as described in detail with reference to FIG. 3, the threshold values $H_w$ and $H_B$ are corrected according to the following equations.

$$H_w = 2N \cdot (L_w/27\ N) = (2/27) \cdot L_w$$

$$H_B = 2\ N \cdot (L_B/26\ N) = (2/26) \cdot L_B$$

Figure 4:
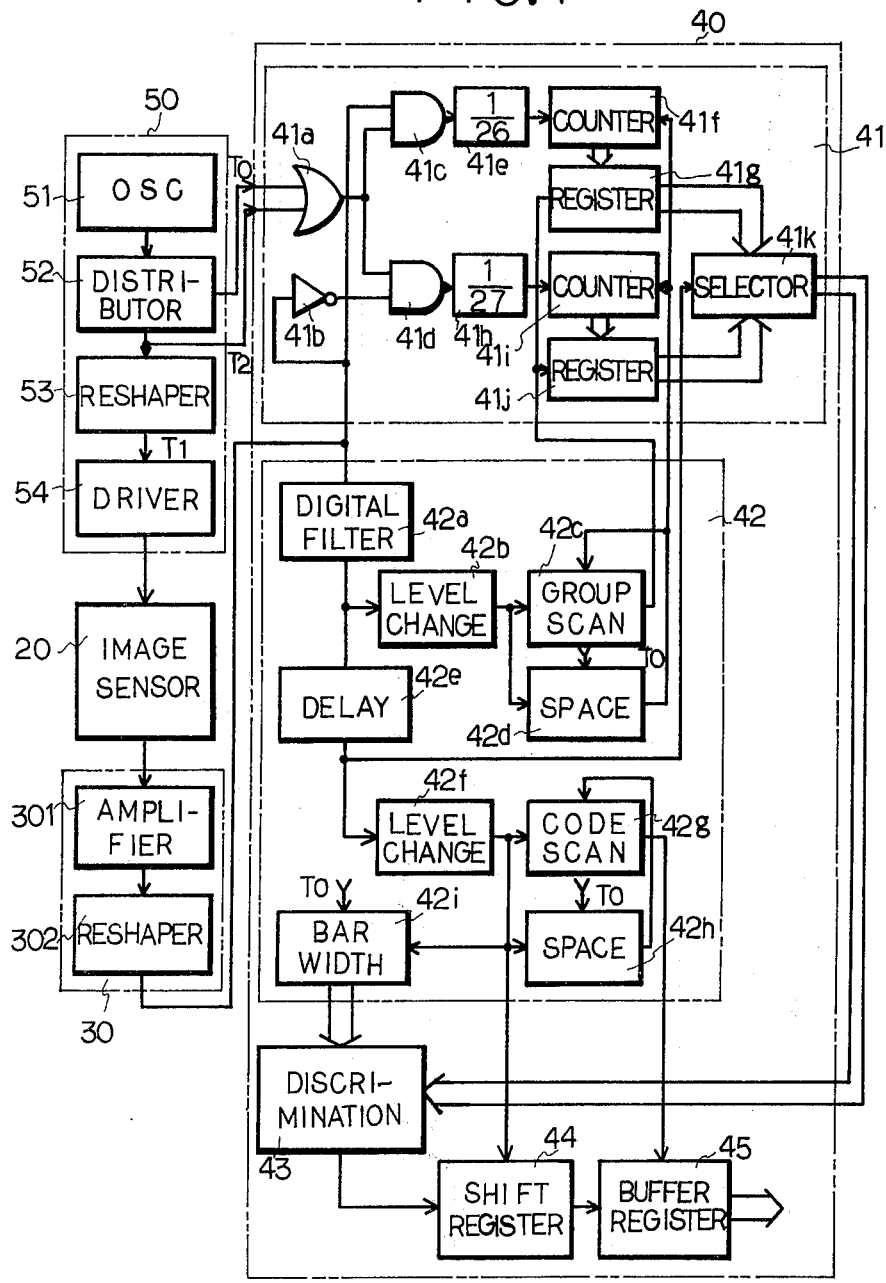
FIG. 4 is an electric wiring diagram illustrating the detail construction of the electric circuit portion shown in FIG. 1.

The detail construction of the system shown in FIG. 1 is shown in FIG. 4 with reference to which further description is made.

The clock circuit 50 is constituted by an oscillator 51, a signal distributor for distributing the clock pulses $T_0$ and $T_2$ which are equal in frequency and different in phase, a signal reshaper 53 for reshaping the clock pulse $T_0$ to generate the clock pulse $T_1$ and a driver 54 for driving the image sensor 20 by the clock pulse $T_1$. The image sensor 20 has 512 photo diodes as the light responsive elements which are sequentially rendered operative by the clock pulse $T_1$. The analog circuit 30 is constituted by an amplifier 301 for amplifying the image signal and a signal reshaper 302 for converting the amplified image signal into the rectangular signal which has the high level indicative of the black bar and the low level indicative of the white bar.

The threshold circuit 41 is constituted by an OR gate 41a for passing both clock pulses $T_0$ and $T_2$, an inverter 41b for inverting the signal level of the rectangular signal, and AND gate 41c for passing the clock pulses only when the rectangular signal level is high, another AND gate 41d for passing the clock pulses only when the rectangular signal level is low, a frequency divider 41e for frequency dividing the clock pulses in one twenty-sixth, a counter 41f for counting the frequency-divided pulses, a register 41g for storing the count value of the counter 41f, another frequency divider 41h for frequency dividing the clock pulses in one twenty-seventh, another counter 41i for counting the frequency-divided pulses, another register 41j for storing the count value of the counter 41i, and a selector 41k for selecting either the output value of the register 41g or the output value of the register 41j. Since the AND gate 41c passes the clock pulses $T_0$ and $T_2$ while the rectangular signal level is high indicative of the black bar and the clock pulses $T_0$ and $T_2$ are frequency divided in one twenty-sixth, the count value of the counter 41f becomes equal to the value $2 \cdot L_B/26$ which is the threshold value $H_B$.

The count value of the counter 41*i* similary becomes equal to the value 2·$L_w$/27 which is the threshold value $H_w$, since the clock pulses $T_0$ and $T_2$ are frequency-divided in one twenty-seventh by the frequency divider 41*h* while the rectangular signal level is low indicative of the white bar. These threshold values $H_B$ and $H_w$ are stored in the registers 41*g* and 41*j*, respectively.

The counter circuit 42 is constituted by a digital filter 42*a* for eliminating a noise pulse having a time width shorter than the one cycle period of the clock pulse $T_1$, a lever change detector 42*b* for detecting the level change of the rectangular signal and generating a detection pulse, a group scan detector for counting the detection pulse and generating a command signal when the count value thereof reaches thirty-six indicative of the completion of one scanning for one group bar code including the space bars SB, a space detector 42*d* for detecting a record prohibition space (6 N) allotted in the left side of the card 70 in FIG. 3 and generating a clear signal when 24 clock pulses are counted during the one cycle period of the detection pulse, a delay circuit 42*e* for delaying the rectangular signal applied through the digital filter 42*a* by a predetermined time period which is equal to one scanning cycle period of the image sensor 20, another level change detector 42*f* for detecting the level change of the delayed rectangular signal and generating a detection pulse, a code scan detector 42*g* for counting the number of detection pulses and generating a command signal when the count value thereof reaches eight indicative of the completion of one scanning for one bar code, another space detector 42*h* for detecting a record prohibition space (6 N) allotted in the right side of the card 70 in FIG. 3 and generating a clear signal which presets −1 in the code scan detector 42*g*, and a bar width counter 42*i* for counting the clock pulse $T_0$ during one cycle period of the detection pulse generated by the level change detector 42*f*.

The operation mode of the digital circuit 40 is described hereinunder.

It is first assumed that the card 70 is moved in such a direction that the scanning is attained from the group bar code having the index code @ to the group bar code having the index code * which are shown in FIG. 2. The image sensor 20, driven by the clock pulse $T_1$, scans the first group bar code having the index code @ at a constant speed from the left to the right of the card 70 shown in FIG. 3. While the first group bar code is scanned for the first time, the rectangular signal generated by the analog circuit 30 is delayed by the delay circuit 42*e* and resultantly the discrimination circuit 43, the shift register 44 and the buffer register 45 does not start to operate. On the contrary, the threshold circuit 41 starts to operate in the following manner. While the left record prohibition space (6 N) of the card 70 is scanned, the analog circuit 30 keeps producing low level signal indicative of the white bar and the level change detector 42*b* does not generate the detection pulse which is designed to reset the space detector 42*d*. The space detector 42*d*, as a result, counts the clock pulse $T_0$, and generates the clear pulse when the count value reaches twenty-four at the completion of scanning the space (6 N). This clear pulse resets the group scan detector 42*c* and the counters 41*f* and 41*i*. When the space bar SB in black is scanned, the output signal level of the analog circuit 30 is charged from low to high and the level change detector 42*b* generates the detection pulse which resets the space detector 42*d*. The space detector 42*d*, as a result, does not generate the clear signal any more, and the group scan detector 42*c* and counters 41*f* and 41*i* are allowed to become operative.

While the group bar code including the space bars SB is scanned, the analog circuit 30 produces the rectangular signal which is kept at the high level and the low level during the scanning of the respective black bars and white bars. The counter 41*f* counts the pulse applied during the scanning of black bars, whereas the counter 41*i* counts the pulse applied during the scanning of white bars. Provided that the total width $L_B$ of 18 black bars in the first group bar code is 26 N, 208 (26×4×2) clock pulses are applied to the frequency divider 41*e* through the AND gate 41*c* due to the fact that 4 clock pulses $T_1$ are applied to scan the unit bar width N and the frequency of the clock pulse produced by the OR gate 41*c* is doubled. The 208 clock pulses are frequency-divided in one twenty-sixth by the divider 41*e*, the count value of the counter 41*f* resultantly becomes eight. On the other hand, the count value of the counter 41*i* also becomes 8, provided that the total width $L_w$ of 17 white bars in the first group bar code is 27 N. When the space bar SB in black at the tail of the first group bar code is completed to be scanned, the group scan detector 42*c* generates the command signal which causes the registers 41*g* and 41*j* to store the count values of the counters 41*f* and 41*i*, respectively. It should be noticed that the values stored in the registers 41*g* and 41*j* are equal to the threshold values $H_B$ and $H_w$.

After the completion of the abovedescribed first scanning, the first group bar code is again scanned due to such a construction that the image sensor 20 is driven cyclically. The portion of the group bar code scanned during the second scanning cycle is different from that scanned during the preceding first scanning cycle, since the card 70 is moved. During this second scanning cycle, the threshold circuit 41 operates in the same manner as described with reference to the first scanning cycle and the level change detector 42*f*, the code scan detector 42*g*, the space detector 42*h* and the bar width counter 42*i* also operate this time. While the second scanning is attained, the rectangular signal generated during the first scanning cycle is passed through the delay circuit 42*e*. When the rectangular signal delayed by the delay circuit 42*e* is at low level indicative of the left space (6 N), the level change detector 42*f* does not generate the detection pulse which resets the space detector 42*h*. The space detector 42*h*, therefore, counts the clock pulse $T_0$ and generates the clear signal at the count value 24. The code scan detector 42*g* presets −1 therein in response to the clear signal. When the delayed rectangular signal is changed from low level to high level for the first time, the level change detector 42*f* generates the detection pulse. This detection pulse resets the space detector 42*h* and concurrently the code scan detector 42*g* is allowed to count the detection pulse. The delayed rectangular signal is applied to the selector 41*k* which in turn selects the threshold value $H_B$ stored in the register 41*g* and the threshold value $H_w$ stored in the register 41*j* in response to the high level signal and the low level signal, respectively. Since the level change detector 42*f* generates the detection pulse each time the level of the delayed rectangular signal is reversed, the count value of the bar width counter 42*i* which counts the clock pulse $T_0$ during one cycle period of the detection pulse is equal to the width of each bar. When the delayed rectangular signal is at high level indicative of the black bar, the discrimination circuit 43 compares the width of the black bar counted by the counter 42i with the threshold value $H_B$ selected by the selector 41k. The discrimination circuit 43 compares the width of the white bar counted by the counter 42i with the threshold value $H_W$ selected by the selector 41k, when the delayed rectangular signal is at low level. Comparing the count value of the counter 42i with the threshold value, the discrimination circuit 43 discriminates whether the bar is wide or narrow and generates high level signal "1" and low level signal "0" indicative of respective narrow bar and wide bar. The output signal successively generated by the discrimination circuit 43 is applied to the shift register 44 to be stored at the application of the detection pulse indicative of the completion of scanning each bar. When 8 detection pulses are applied to the code scan detector 42g, indicating the completion of scanning the bar code, the code scan detector 42g generates the command signal which is applied to the buffer register 45 so that the output signal of the shift register 44 is transferred to the buffer register 45 to be stored as the parallel digital signal. Each digit of the stored parallel digital signal is indicative of each bar width. After the completion of discriminating the index bar code @, the following numerical codes 1, 2, 3, are sequentially discriminated in the same manner as the index code @. It should be noted herein that, while the abovedescribed discriminating step is attained, the threshold circuit 41 determines the threshold values $H_B$ and $H_W$ in accordance with the result of second scanning so that these threshold values $H_B$ and $H_W$ are made available for discriminating the width of bars scanned during the second scanning cycle.

Repeating the scanning at plural numbers of times for each group bar code, the central processing unit 60 shown in FIG. 1 is enabled to decode the group bar code at each completion of the scanning. The validity of decoded information is enhanced, provided that the central process unit 60 is designed to discriminate whether the presently decoded information is identical with the precedingly decoded information or not.

The above described embodiment may be modified as follows as well. The width of bars scanned in the present scanning cycle may be discriminated with reference to the threshold value determined in proportion to the total width of bars scanned in the preceding scanning cycle without delaying the rectangular signal.

According to this modification, the level change detectors 42b and 42f are replaced by a single level change detector, and the space detectors 42d and 42h are also replaced by a single space detector, thus simplifying the counter circuit 42. The width of bars may be discriminated with reference to a single threshold value determined in proportion to the total bar width of either black bars or white bars. According to this modification, the AND gates 41c and 41d, the frequency dividers 41e and 41h, the counters 41f and 41i and the registers 41g and 41j are respectively replaced by a single AND gate, a single frequency divider, a single counter and a single register, and the inverter 41b and the selector 41k are eliminated, thus simplifying the threshold circuit 41.

Whatever modification the present invention may be subjected to, the following advantage is obtained. Various bar codes having respective bar width, having respective distances from the image sensor or having respective moving directions which are aslant to the scanning line of the image sensor are correctly recognized, since the threshold value is automatically corrected in proportion to the total bar width.

What we claim is:

1. In combination with an object carrying a bar code having a plurality of bars which are arranged in white and in black alternately to extend parallelly and have two bar widths, a bar code recognition system comprising:
    a sensor for scanning said bar code transversely at a constant speed to produce a train of signals indicative of said bars;
    a reshaping circuit, connected to said sensor, for reshaping said signals into a train of rectangular signals having a first and a second output level corresponding to said bars in white and in black respectively, and having time widths proportional to respective widths of said bars;
    a threshold circuit, connected to said reshaping circuit, for determining a first and a second threshold value in proportion to respective total time widths of said first and second output levels of said rectangular signals; and
    a discriminating circuit, connected to said threshold and measuring circuit, for comparing the output value of said measuring circuit with a corresponding one of said first and second threshold values, whereby the width of each of said bars is discriminated to decode said bar code.

2. A recognition system according to claim 1 further comprising:
    a clock circuit, connected to said sensor, for repeatedly driving said sensor by a train of clock pulses of a fixed frequency, whereby said bar code is scanned repeatedly at different portions during the relative movement between said sensor and said object.

3. A recognition system according to claim 2, further comprising:
    a storing circuit, connected between said threshold and discriminating circuits, for storing said first and second threshold values while another scanning is repeated by said sensor whereby the width of each of said bars is compared with said corresponding one of said threshold values determined in response to the preceding scanning of said sensor.

4. A recognition system according to claim 2 further comprising:
    a storing circuit, connected between said threshold and discriminating circuits, for storing said first and second threshold values while another scanning is repeated by said sensor; and
    a delay circuit, connected between said reshaping and discriminating circuits, for delaying said rectangular signals by a predetermined period equal to one scanning cycle period of said sensor.

5. A recognition system according to claim 2, wherein said sensor has a plurality of light responsive elements arranged in a straight line along the scanning direction and driven one by one in response to said clock pulses for respectively sensing the density of light corresponding to said bar code.

6. A method for recognizing a bar code having a plurality of bars recorded parallelly on an object in two different light reflective colors and in two different widths comprising the steps of:
    supplying light on said object;
    scanning the density of light reflected by said bar code at a constant speed in a direction transverse to the longitudinal direction of each of said bars to produce detection signals changing the signal level between two predetermined levels at the change of the density of scanned light, said two predetermined levels corresponding to said two different colors, respectively;

measuring two total time periods in which said detection signals are kept at said respective predetermined levels in one cycle period of said scanning step;

determining two threshold values in proportion to said two total time periods, respectively;

storing said two threshold values during said one cycle period of said scanning step;

measuring each time period in which said detection signals are kept at said two predetermined levels; and comparing said each time period with a corresponding one of said two threshold values to thereby discriminate the width of each of said bars.

7. A method according to claim 6 further comprising the steps of:

moving said object along the longitudinal direction of each of said bars; and repeating said scanning step during the movement of said object, whereby said first measuring, determining, storing, second measuring and comparing steps are repeated at each repetition of said scanning step.

8. A method according to claim 7 further comprising the step of:

delaying said second measuring step by a time period equal to said one cycle period of said scanning step.

9. A method for recognizing a bar code having a plurality of parallel bars recorded on an object in a first and second contrastive color alternately and in different wieths comprising the steps of:

scanning said bar code in a direction transverse to the longitudinal direction of said parallel bars to produce a train of output signals having a first and second level corresponding to said first and second colors respectively;

measuring a first and second total time period in which said output signals are kept at said first and second levels, respectively, in one cycle period of said scanning step;

determining first and second threshold values in proportion to said first and second total time periods, respectively;

measuring each time period in which said output signals are kept at said first and second levels, respectively;

selecting said first and second threshold values alternately in response to said first and second levels of said output signals; and comparing said each time period with corresponding one of said first and second threshold values selected in said selecting step to thereby discriminate the width of each of said parallel bars.

10. A method according to claim 9, further comprising:

keeping the scanning speed of said scanning step at a constant speed by a train of clock pulses of a fixed frequency; and delaying the application of said output signals of said scanning step to said each time period measuring step and said selecting step by a predetermined time period equal to one scanning cycle period of said scanning step.

11. A method according to claim 10, further comprising:

repeating said scanning step automatically by said clock pulses so that said steps subsequent from said scanning step are responsively repeated; and moving said object in a direction parallel to the longitudinal direction of said parallel bars, whereby said bar code is scanned at plural times at different portions.

12. A method according to claim 9, further comprising:

generating a train of clock pulses at a fixed frequency;

keeping the scanning speed of said scanning step at a constant speed by said clock pulses;

repeating said scanning step automatically by said clock pulses so that said steps subsequent from said scanning step are responsively repeated; and moving said object in a direction parallel to the longitudinal direction of said parallel bars, whereby said bar code is scanned at plural times at different portions.

* * * * *